United States Patent [19]

Ducrocq

[11] Patent Number: 5,350,439

[45] Date of Patent: Sep. 27, 1994

[54] PROCESS AND APPARATUS FOR THE REPLACEMENT OF A FIRST FLOW OF GAS ACCOMPANYING A FLOW OF PARTICLES WITH A SECOND FLOW OF GAS

[75] Inventor: Jean Ducrocq, Guyancourt, France

[73] Assignee: L'Air Liquide, Societe Anonyme pour l'Etude et l'Exploitation des Procedes Georges Claude, Paris, France

[21] Appl. No.: 94,023

[22] PCT Filed: Jan. 22, 1993

[86] PCT No.: PCT/FR93/00065

§ 371 Date: Jul. 26, 1993

§ 102(e) Date: Jul. 26, 1993

[87] PCT Pub. No.: WO93/15362

PCT Pub. Date: Aug. 5, 1993

[30] Foreign Application Priority Data

Jan. 27, 1992 [FR] France .................. 92 00811

[51] Int. Cl.$^5$ ............................................... C21B 7/16
[52] U.S. Cl. ........................................ 75/460; 266/221; 266/268
[58] Field of Search .................. 266/221, 268; 75/460

[56] References Cited

U.S. PATENT DOCUMENTS

4,363,656 12/1982 Ponghis et al. ............... 75/10.22

FOREIGN PATENT DOCUMENTS

0227205 7/1987 European Pat. Off. .
872305 3/1953 Fed. Rep. of Germany .
59-082228 5/1984 Japan .

*Primary Examiner*—Melvyn J. Andrews
*Attorney, Agent, or Firm*—Young & Thompson

[57] ABSTRACT

A first flow of gas (C) accompanying a flow of solid particles (S), is sent at supersonic speed into a first conduit (1) prolonged by a third conduit (8) and intersecting a second conduit (6) supplying a second flow of gas (G) which is deflected into the third conduit (8) to accompany the flow of particles (S) whose trajectory is not substantially modified, the flow of the first gas (C) being deflected, downstream of an oblique shockwave (13) into a fourth conduit (9) forming a separator nose (10) with the third conduit (8). The invention is particularly applicable to the injection, into a reaction chamber (16), of solid particles with a highly oxygenated gas (G) replacing an inert gas (C) for conveying the particles.

10 Claims, 2 Drawing Sheets

PROCESS AND APPARATUS FOR THE REPLACEMENT OF A FIRST FLOW OF GAS ACCOMPANYING A FLOW OF PARTICLES WITH A SECOND FLOW OF GAS

BACKGROUND OF THE INVENTION

In numerous techniques, solid particles are sent to a utilization station in a carrier or conveying gas. Thus, numerous processes of combustion use an injection of combustible solid in pulverized form conveyed by a gas, typically air or nitrogen. At the utilization station, it is frequently desirable to treat the particles in another gaseous environment than the conveying gas. For example, in combustion processes, the outputs are greatly improved by enrichment of the combustible with oxygen. Thus, the combustion of pulverized carbon injected into a blast furnace is greatly improved in the presence of air enriched with oxygen or pure oxygen. However, in a continuous process, it is not possible to burn the pulverulent solid without diluting the combustible with the conveying gas. In particular, the combustion in pure oxygen of the carbon is impossible if the supply device for the pulverized solid does not also operate with pure oxygen, which is impossible for safety reasons. Another problem resides in the time necessary for the mixing in situ of the flow of solid particles with the combustible gas. In practice, a dense jet of pulverulized solid disperses poorly and a portion of the particles is not contacted with the combustible gas under the required conditions.

SUMMARY OF THE INVENTION

The present invention has exactly for its object to provide a process permitting the rapid separation, without mechanical means, and continuously, of a flow of solid particles and a conveying gas flow at the inlet of a reaction region supplied with a gas of controlled composition as well as the substantially instantaneous mixing of the flow of solid particles and of the gas of controlled composition by replacement of the flow of conveying gas.

To do this, according to a characteristic of the invention, such a replacement process of a first gas flow accompanying a flow of solid particles by a second gas flow, comprises the steps of sending the first gas flow at supersonic speed and the flow of particles in a first direction, causing them to intersect, in an interaction zone, with the second gas flow sent in a second direction forming an angle with the first, deflecting the first gas flow in a direction substantially parallel to the second direction and the second gas flow substantially in the first direction to accompany the flow of particles whose path has not been substantially changed.

The present invention also has for its object an apparatus to practice this process, comprising a first conduit extending in a first direction, connected upstream to a first source of gas under pressure and injection means for solid particles, a second conduit, connected upstream to a second source of gas under pressure and intersecting the first conduit at an angle in an interaction zone, a third conduit in prolongation of the first conduit beyond the zone of interaction, and a fourth conduit intersecting the first conduit in the zone of interaction and forming with the third conduit a nose for separating flow, directed toward the second conduit.

BRIEF DESCRIPTION OF THE DRAWINGS

Other characteristics and advantages of the present invention will become apparent from the following description of embodiments, given for illustration but not at all limiting, with respect to the accompanying drawings, in which.

DETAILED DESCRIPTION OF THE INVENTION

Figure 1:
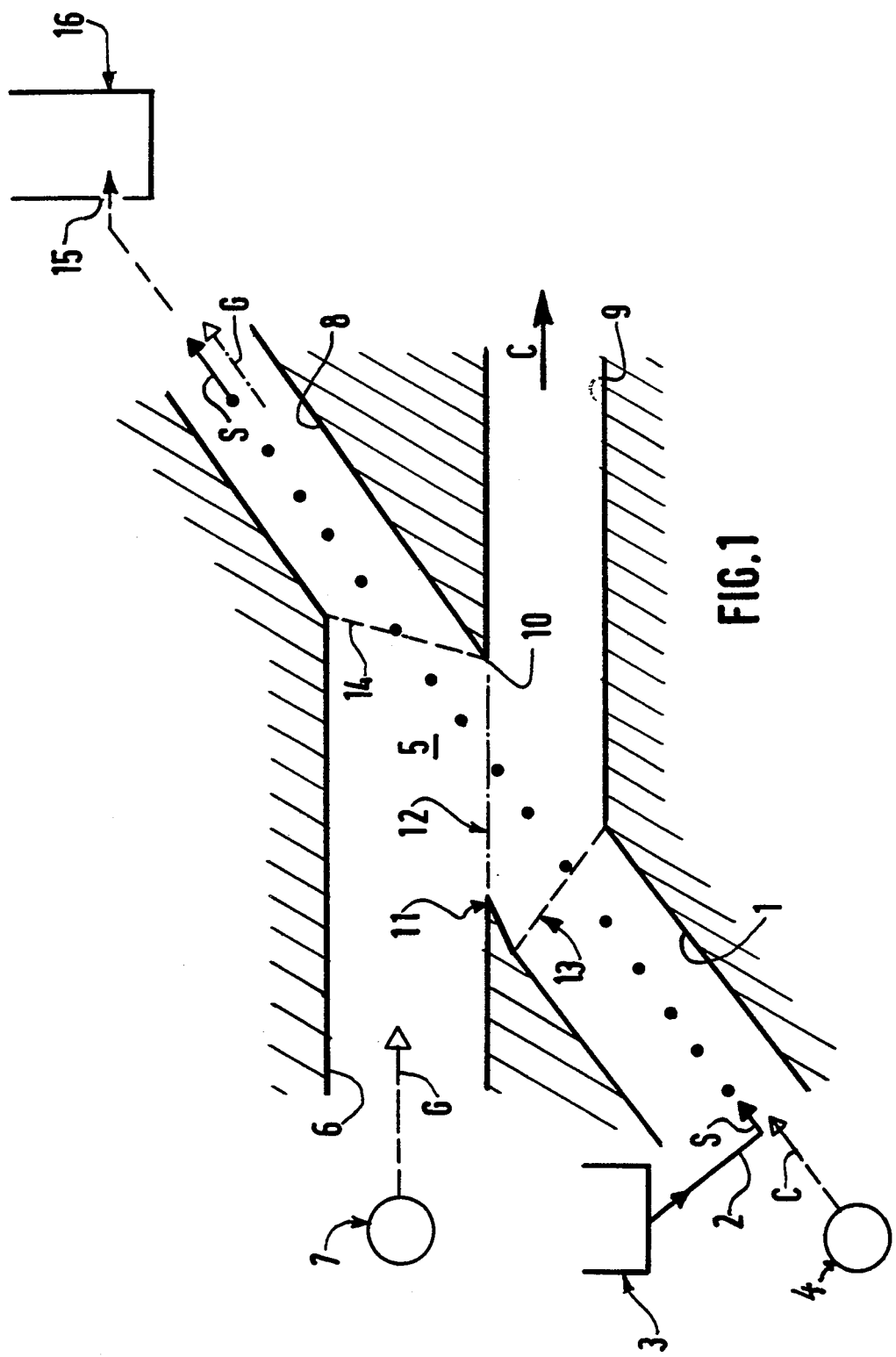
FIG. 1 is a schematic view of an apparatus for practicing the process according to the invention.

In the description which follows and in the drawings, identical or analogous elements bear the same reference numerals.

In FIG. 1, there is shown a first conduit 1 conducting a flow of solid particles S introduced upstream by an injection device 2 connected to a particle supply 3, and a conveying gas flow C from a first source of gas under pressure 4. The flows S and C are accelerated in a nozzle such that the speed of the gas in the conduit 1 will be supersonic, the speed of the solid particles representing an important portion of the gas speed. The conduit 1 empties into an interaction zone 5 into which empties a second conduit 6 conveying a flow of a second gas G from a second gas source under pressure 7 and accelerated in a nozzle such that the speed of flow of gas G in the second conduit 6 will also be supersonic.

Conduit 6 forms with the conduit 1 an angle not exceeding 450 typically between 20° and 30°. A third conduit 8 extends from the interaction zone 5 in prolongation of the first conduit 1. The apparatus comprises also a fourth conduit 9, preferably substantially parallel to the second conduit 6 but offset transversely relative to this latter to the side of the first conduit 1, so as to intersect this latter and to form, with the third conduit 8, a divider nose 10 substantially aligned with the portion of the wall of the second conduit 6 adjacent the first conduit 1. The connection between these latter is effected by a profiled structure 11 for deflection of the first flow of gas toward the nose 10 forming an internal edge for anchoring a shockwave.

The meeting of the supersonic flows C and G creates in the interaction zone 5 an interface zone 12 between the deflector structure 11 and the nose 10 and an oblique shockwave 13 in the downstream portion of the first conduit 1. A second oblique shockwave 14 forms at the inlet of the third conduit 8, anchored by the nose 10. In this manner, the flow C of conveying gas is deflected from the first conduit 1 toward the fourth conduit 9 while the flow of gas G is deflected from the second conduit 6 toward the third conduit where it accompanies the flow of particles S which, because of their inertia, have not undergone substantial change of their trajectory directly from the first conduit 1 into the third conduit 8.

The particles S accompanied by the gas flow G can be sent, at the outlet of the third conduit 8, toward a utilization station or reaction chamber, to be for example injected into a burner 15 of a combustion device 16 which can be an oven or a blast furnace. In this case, the particles S are particles of solid combustible, typically carbon, the conveying gas C being a largely inert gas, for example air or preferably nitrogen, the replacement gas G being a gas with a high content of oxygen, preferably pure oxygen. According to the aerodynamic conditions downstream of the second shockwave 14, the solid particles S will accelerate or slow the flow of replacement gas G, as a function of the time of contact to be effected in the reaction chamber 16.

Figure 2:
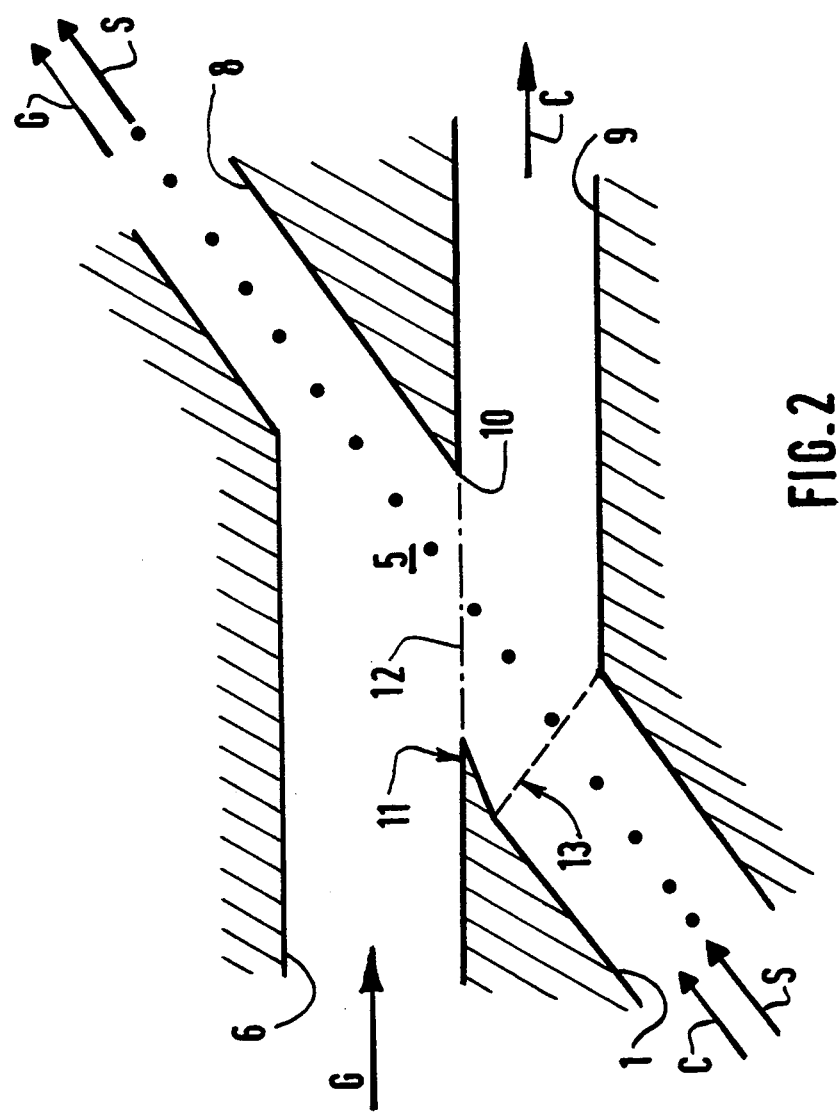
FIG. 2 is a schematic view of a modified embodiment of the invention.

The modification of FIG. 2 is distinguished from that which has been previously described solely by the fact that the replacement gas G introduced by the second conduit 6 is not at supersonic speed. The parameters of the gaseous flow and of the interaction zone 5 are here determined such that the conveying flow C will become, downstream of the shockwave 13, in the first conduit 1, substantially parallel to the flow of replacement gas G and that their pressure will be equal at the interface 12. As before, the flow of conveying gas C is thus deflected toward the fourth conduit 9 while the flow of replacement gas G is deflected toward the third conduit 8 to accompany the flow of particles S whose trajectory has not been changed between the first conduit 1 and the third conduit 8, which typically has a cross section smaller than that of the first conduit 1.

Although the present invention has been described with relation to particular embodiments, it is not thereby limited but is on the contrary susceptible to modifications and variations which will be apparent to one skilled in the art.

I claim:

1. Process for replacing a first gas flow accompanying a flow of solid particles by a second gas flow, said process comprising: sending the first gas flow at supersonic speed and the flow of particles in a first direction; intersecting in an interaction zone said first gas flow and said flow of particles with the second gas glow, said second gas glow being sent in a second direction forming an angle with the first direction; deflecting the first gas flow in a direction substantially parallel to the second direction; and deflecting the second flow of gas substantially in the first direction, so as to replace said first gas flow and accompany the flow of particles in said first direction.

2. Process according to claim 1, wherein a first oblique shockwave is created in the first gas flow upon entry into the interaction zone.

3. Process according to claim 2, wherein the second gas flow is sent at supersonic speed, and wherein a second oblique shockwave is created in the path of the second gas flow, downstream of the interaction zone.

4. Process according to claim 1, wherein the solid particles are of combustible material, and the second gas is a gas with a high oxygen content.

5. Process according to claim 4, wherein the first gas is a substantially inert gas.

6. Process according to claim 4, wherein the deflected second gas flow accompanying the flow of particles is injected in a reaction chamber.

7. Apparatus for replacing a first gas flow accompanying a flow of solid particles by a second gas flow, said apparatus comprising:
a first conduit extending in a first direction, connected to a first source of gas under pressure, and to means for injection of solid particles;
a second conduit, connected to a second source of gas under pressure, and intersecting the first conduit at an angle in an interaction zone;
a third conduit extending in said first direction in prolongation of the first conduit beyond the interaction zone; and
a fourth conduit intersecting the first conduit in the interaction zone, said fourth conduit intersecting the third conduit and forming with the third conduit a separator nose directed toward the second conduit.

8. Apparatus according to claim 7, wherein the fourth conduit is substantially parallel to, but laterally offset of, the second conduit in a direction opposite the third conduit.

9. Apparatus according to claim 8, wherein the separator nose is substantially aligned with a portion of the wall of the second conduit adjacent the first conduit.

10. Apparatus according to claim 7, further comprising a deflector structure in the first conduit forming a connection with the second conduit.

* * * * *